Figure 1:
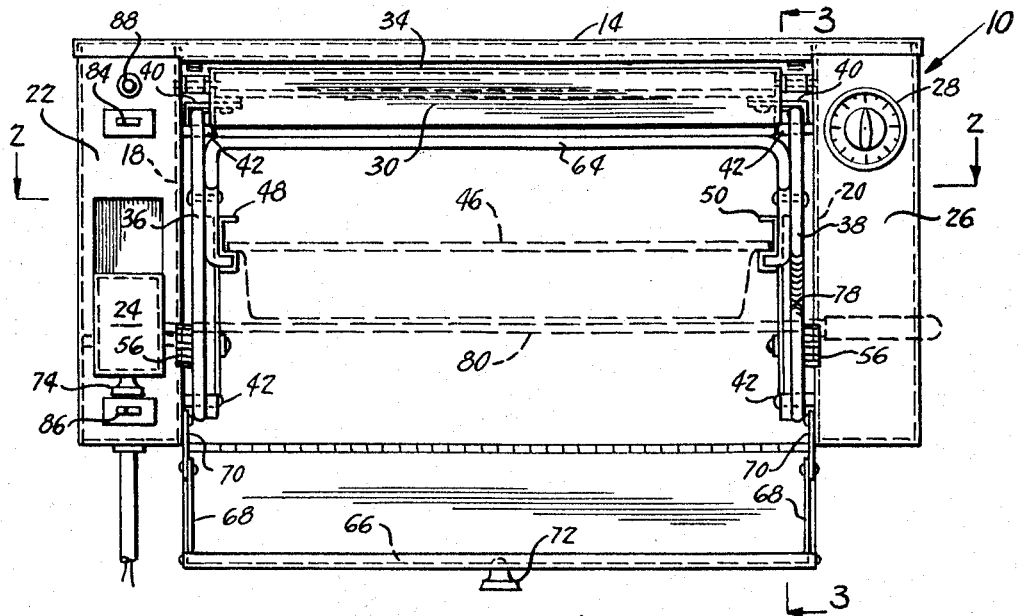

Aug. 2, 1966 K. APPLEMAN 3,263,593
FOLDING BROILER AND ROTISSERIE UNIT
Filed March 12, 1965 2 Sheets-Sheet 1

INVENTOR.
KENNETH APPLEMAN
BY
Kimmel, Crowell & Weaver
ATTORNEYS.

Aug. 2, 1966      K. APPLEMAN      3,263,593

FOLDING BROILER AND ROTISSERIE UNIT

Filed March 12, 1965      2 Sheets-Sheet 2

INVENTOR.
KENNETH APPLEMAN
BY
Kimmel, Crowell & Weaver
ATTORNEYS.

United States Patent Office 3,263,593
Patented August 2, 1966

3,263,593
FOLDING BROILER AND ROTISSERIE UNIT
Kenneth Appleman, New York, N.Y., assignor to Purcarb, Inc., New York, N.Y., a corporation of New York
Filed Mar. 12, 1965, Ser. No. 439,186
6 Claims. (Cl. 99—324)

The present invention relates to kitchen equipment generally and in particular to a folding broiler and rotisserie unit.

Currently popular and in use in residences, clubs, church kitchens, and the like, are combination broiler and rotisserie units of the portable type. Due to the weight of the average unit, the matter of shifting the unit from a place of storage to a table top for use, often requires more than the average female strength and entails the expenditure of such energy as to deflect from, in the mind of the average housewife, the advantages of preparing foods by broiling.

This often results in the broiler and rotisserie unit being little used in the household. The matter of stowage of such a unit is further complicated by the necessity for clearing and cleaning the unit before storing it away and as such a unit stays heated for a relatively long interval of time after use, the cleaning must be postponed until the unit is cool, thus leaving the unit exposed and in the way of persons engaged in clearing away the utensils and other equipment used in the preparation of a meal.

The primary object of the pertinent invention is to provide a broiler and rotisserie unit which folds to a compact package against the wall when not in use and when in the extended position projects forwardly of the wall and may be placed at eye level in the kitchen for convenient use.

Another object of the present invention is to provide a folding broiler and rotisserie unit having few parts which require cleaning after use, one which may be folded with such parts removed for cleaning and while still heated after use, and one which is neat and attractive in appearance.

A further object of the present invention is to provide a folding broiler and rotisserie unit for installation either on or in an opening in the wall of a house, club, church kitchen, or the like which is extremely useful in the preparation in food, one which provides food with all the enhancement due to charcoal broiling without the use of charcoal, one which is useful in the destruction of unwanted fats in the food being cooked, and one which is economically feasible.

A still further object of the present invention is to provide, in a broiler and rotisserie structure, a unit of simple structure, one sturdy in construction, and one which is fool proof in operation.

Figure 2:
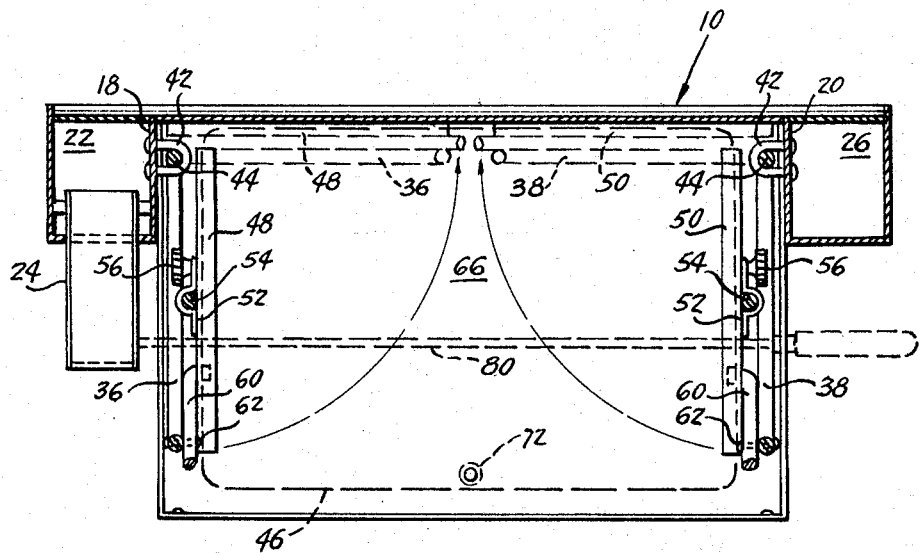
Figure 3:
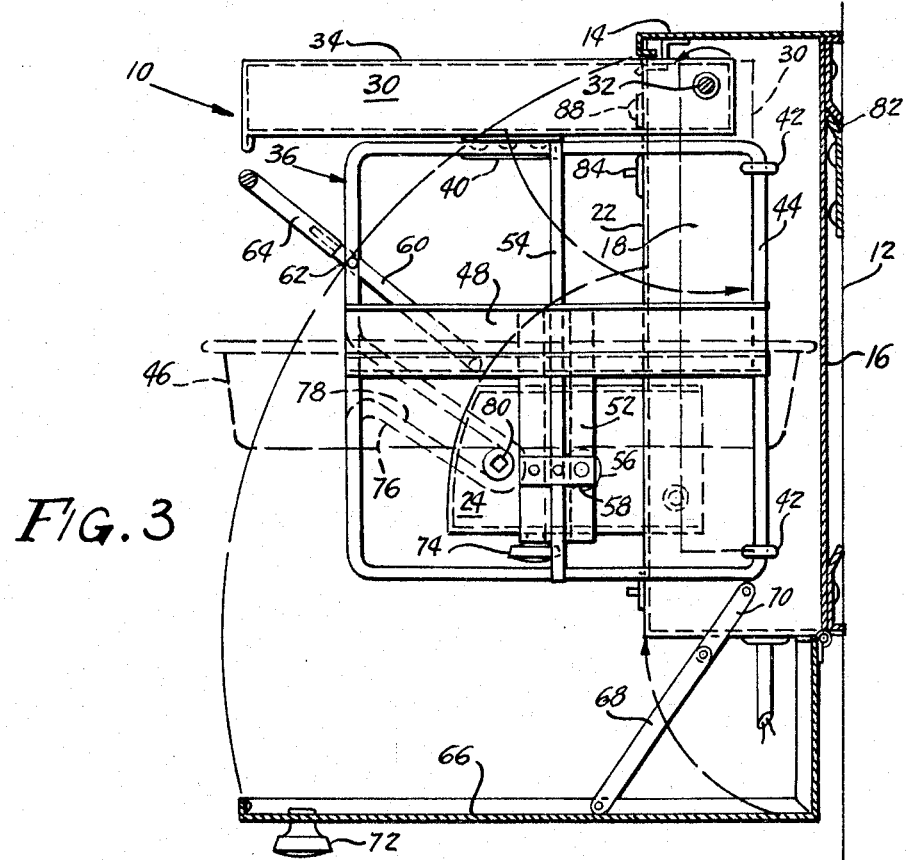
Figure 4:
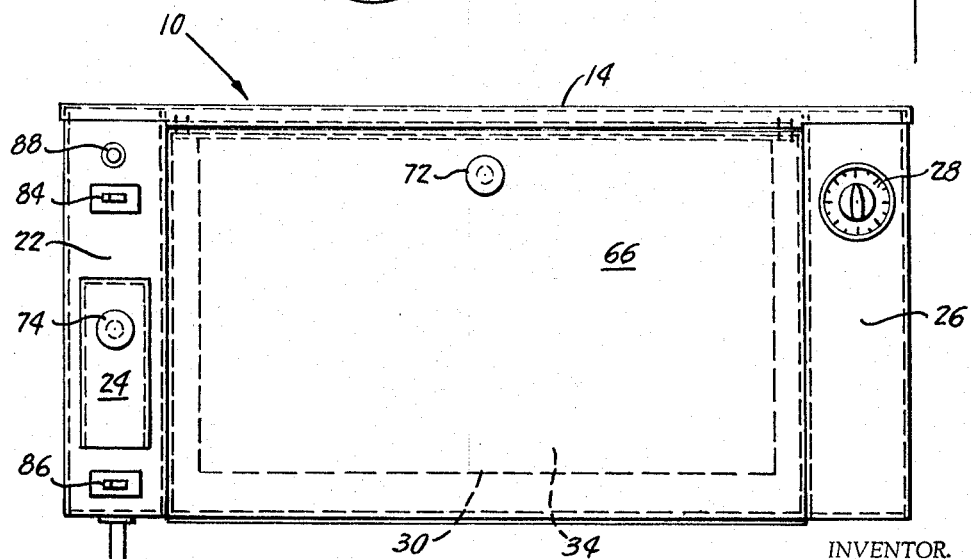

These and other objects and advantages of the present invention will be apparent from the following description when considered in connection with the annexed drawings, in which:

FIGURE 1 is a front elevational view of the unit according to the parts in the invention, shown in open or use position, FIGURE 2 is a view taken on the line 2—2 of FIGURE 1, FIGURE 3 is a view on an enlarged scale, taken on the line 3—3 of FIGURE 1, and FIGURE 4 is a front elevational view of the unit in closed condition.

With reference to the drawings in detail, in which like numbers indicate like parts throughout the several views, the combination broiler and rotisserie unit of the present invention consists in a housing 10 adapted to be secured in an upright condition against a wall surface, the latter indicated in FIGURE 3 by the numeral 12. The housing 10 includes a top 14, a back wall 16, and side walls 18 and 20.

The wall 18 also forms one wall of an upright housing 22 having therein the rotisserie motor 24 of conventional construction, the motor unit being hingedly connected within the housing 22 for swinging movement from an upright position to a horizontal position as shown in FIGURE 2.

Similarly the wall 20 of the housing 10 is also one wall of another housing 26 containing therein a timer unit 28 of conventional make and construction.

Adjacent the upper end of the housing 10 and in a horizontal position when in a condition of use is a source of radiant heat as at 30 in FIGURE 3.

A shaft 32 extending through the casing of the heat source 30 connects the casing to the housing 10 for swinging movement from the horizontal position to a position within the housing 10 as indicated by broken lines in FIGURE 3.

When the casing 34 of the heat source 30 is in the horizontal position, it is supported upon the upper ends of support members 36 and 38 which project perpendicularly from the housing 10 when they are in the use position.

Angled brackets 40, carried on each end of the casing 34 hook over the upper ends of the support members 36 and 38 for support of the casing 34 as shown most clearly in FIGURE 1.

Means is provided for hingedly connecting the support members 36 and 38 to the side walls 18 and 20, respectively, for swinging movement of the support members 36 and 38 from the full line in use position shown in FIGURE 2 to the dotted line nested position abutting and adjacent the back wall 16 of the housing 10.

This means consists in U-shaped elements 42 adjacent the upper and lower ends of the support members 36 and 38 and receiving therein the one end member 44 of the support members 36 and 38, the elements 42 being securely anchored in the side walls 18 and 20 as shown in FIGURES 1 and 3.

In FIGURE 3 the dotted lines represent a shallow pan representing a rack for food to be cooked. Means is provided by the present invention for supporting such a pan 46 between the support members 36 and 38 when the latter are in the perpendicular position with respect to the housing 10. Such means consists in a first channel member 48 associated with the support member 36 and a second channel member 50 associated with the support member 38. Means is provided for adjustably positioning the channel members 48 and 50 simultaneously upwardly and downwardly with respect to the heating element in the casing 34 so that the food can be moved farther away or closer to the source of heat as desired. This means consists in a guide element 52 mounted upon a posts 54 which is mounted on the support member 36. A similar guide element and post are associated with the support member 38 and support the channel member 50 on the support member 38, the drawing showing best in FIGURE 3 the structure of the guide element 52 and 54 with reference to the support member 36.

Means is provided for releasably securing the channel members 48 and 50 in any position of the up and down movement on the post 54. This means consists in a thumb screw and nut assembly 56 anchored in each of the guide elements 52 and operable to press a strap device 58 into tight engagement with the adjacent post 54, as shown in FIGURE 3. The strap 58 bridges the groove provided in the guide element 52 and has one end spot-welded to the guide element 52 with the other end free and movable toward and away from the post 54 in accordance with tightening or loosening of the thumb screw and nut assembly 56, the strap devices 58 being on the inside of the support members 36 and 38 when they are in the projecting position as shown in FIGURE 3.

An actuable means is provided for raising or lowering the guide elements 52 so as to position the pan 46 closer or away from the casing 34. This hand actuable means consists in a lever 60 pivotally connected intermediate its ends to each of the support members 36 and 38 by means of pivot pins 62. The pins 62 prevent rocking movement of the levers 60 about the pins 62 as horizontal axes. A U-shaped handle element 64 is removable from the free ends of the levers 60 so that when the device is folded into the housing 10, the handle 64 does not interfere with its folding.

The free ends of the levers 60 remote from the handle 64 are turned inwardly, as shown in FIGURE 2, so as to be slidably received in outwardly facing channels in the channel members 48 and 50. Rocking movement of the handle 64 in a downward direction serves to raise the pan 46 toward the casing 34 when the pan 46 is supported in the channel members 48 and 50.

A cover for the open front and bottom of the housing 10 is provided by a tray element 66 of L-shape configuration having the free end of its short leg hingedly connected to the back wall 16 of the housing 10. When the tray element 66 is in the projected position shown in FIGURE 3, linkage members 68 and 70 support the long leg of the tray element 66 in a horizontal position so that it may serve as a support for dishes and the like.

A knob 72 is provided on the exterior surface of the tray element 66 in order to serve as a handle for moving the tray element from its position of use to its non-use position. Another knob 74 on the rotisserie motor 24 enables the person using the unit of the present invention to shift the motor 24 from the nested position within the housing 22 to a use position as in FIGURE 3.

The one vertical member 76 of the right hand support member 38 is bent upon itself to form a slot 78 for receiving one end portion of a spit 80 shown in dotted lines in FIGURES 1 and 2, the spit 80 being of conventional use in construction and being rotated by the motor 24.

Interlocking leaf brackets 82, as shown in FIGURE 3, may be employed to support the housing 10 on the wall surface 12 in the conventional manner of supporting cupboards on such a wall surface.

Alternatively the rotisserie unit or housing 10 may be mounted with a suitably sized opening in a wall surface if desired.

The auxiliary housing 22 also has a receptacle 84, switch 86, and a signal light 88 for indicating when the broiler unit or heat source is energized.

From the above description it will be seen that the objects of the invention are attained and that the unit according to the present invention is foldable from the in-use position to the nested position wholly within the cabinet or housing 10 with the open front and open bottom covered by the tray element 66 when closed. The unit of the present invention may be manufactured in sizes suitable for residences or in sizes suitable for commercial establishments such as clubs, restaurants, and the like as desired.

While only a preferred embodiment of the invention has been shown and described it is contemplated that other embodiments may be made and practiced and that numerous changes and modifications in the invention may be made without departing from the spirit of the invention as set forth in the appended claims.

What is claimed is:

1. A broiler and rotisserie unit comprising an upright housing, a source of heat extending from said housing adjacent the upper end thereof, means connecting said heat source to said housing for swinging movement from the extended position to a nested position within said housing, a pair of vertically disposed spaced-apart parallel support members projecting perpendicularly from said housing, means connecting each of said support members to said housing for swinging movement from the perpendicular position to a position nested within said housing, means adjacent each of said support members for receivingly engaging an end portion of a food supporting rack when disposed between said support members, and means connecting each of said rack supporting means to the adjacent support member for upward and downward movement.

2. A broiler and rotisserie unit comprising an upright housing having a back wall and spaced-apart side walls, a source of heat extending from said housing adjacent the upper end thereof, means connecting said heat source to said housing for swinging movement from the extended position to a nested position within said housing, a pair of vertically disposed spaced-apart parallel support members projecting perpendicularly from said housing, inter-engaging means on said heat source and on said support members for supporting said heat source in the extended position, means connecting each of said support members to the adjacent side wall for swinging movement about a vertical axis from the perpendicular position to a position nested within said housing, means adjacent each of said support members for receivingly engaging an end portion of a food supporting rack when disposed between said support members, and means connecting each of said rack supporting means to the adjacent support member for upward and downward movement.

3. The apparatus according to claim 1 together with releasable lock means for holding each of said rack supporting means in any position of upward and downward movement.

4. A broiler and rotisserie unit comprising an upright housing having a back wall and spaced-apart side walls, a source of heat extending from said housing adjacent the upper end thereof, means connecting said heat source to said housing for swinging movement from the extended position to a nested position within said housing, a pair of vertically disposed spaced-apart parallel support members projecting perpendicularly from said housing, inter-engaging means on said heat source and on said support members for supporting said heat source in the extended position and holding said support members in the perpendicular position, means connecting each of said support members to the adjacent side wall for swinging movement about a vertical axis from the perpendicular position to a position nested within said housing, a horizontally disposed channel member position adjacent each of said support members, said channel members being adapted to receivingly engage an end portion of a food supporting rack when disposed between said support members, and means connecting each of said channel members to the adjacent support member for upward and downward movement.

5. A broiler and rotisserie unit comprising an upright housing having back wall, a top, spaced-apart side walls, and an open front and bottom, a horizontally disposed source of radiant heat projecting from said housing open front adjacent said top, means connecting said source to said housing for swinging movement from the horizontal position to a vertical position nested within said housing, a vertically disposed support member disposed adjacent to and parallel with each of said housing side walls, means connecting one end of each of said support members to the contiguous side wall for swinging movement from the parallel position to a nested position abutting said housing back wall, an upright post carried by each of said support members, a guide element slidably mounted on each of said posts for upward and downward movement, a horizontally disposed channel member carried on each of said guide elements for movement therewith, said channel members facing each other and being adapted to receivingly engage the end portions of a food supporting rack, a lever pivotally connected intermediate the ends thereof to each of said support members adjacent the other end thereof for rocking movement about a horizontal axis, each of said levers having one end operatively connected to the adjacent channel member and operable in response to rocking movement in one direction to raise said channel member on the adjacent one of said posts and to rocking movement in the other direction to lower said channel member on said post, and removable handle means connecting the other ends of said levers together.

6. A broiler and rotisserie unit comprising an upright housing having a back wall, a top, spaced apart side walls, and an open front and bottom, a horizontally disposed source of radiant heat projecting from said housing open front adjacent said top, means connecting said source to said housing side walls for swinging movement from the horizontal position to a vertical position nested within said housing, a vertically disposed support member disposed adjacent to and parallel with each of said housing side walls, means connecting one end of each of said support members to the contiguous side wall for swinging movement from the parallel position to a nested position abutting said housing back wall, an upright post carried by each of said support members intermediate the ends thereof, a guide element slidably mounted on each of said posts for upward and downward movement, a horizontally disposed channel member carried on each of said guide elements for movement therewith, said channel members facing each other and being adapted to receivingly engage the end portions of a food supporting rack, a lever pivotally connected intermediate the ends thereof to each of said support members adjacent the other end thereof for rocking movement about a horizontal axis, each of said levers having one end operatively connected to the adjacent channel member and operable in response to rocking movement in one direction to raise said channel member on the adjacent one of said posts and to rocking movement in the other direction to lower said channel member on said post, removable handle means connecting the other ends of said levers together, and a tray element extending forwardly out of said housing open front and hingedly connected to said housing lower end for swinging movement from the extended position to a position closing the open front and bottom of said housing when said heat source and said support members are in the nested position and said handle is removed from said levers.

References Cited by the Examiner
UNITED STATES PATENTS

| | | | |
|---|---|---|---|
| 1,456,474 | 5/1923 | Sussman | 126—19 |
| 2,694,392 | 11/1954 | Oatley | 126—41 |
| 2,915,960 | 12/1959 | McClellan | 126—273 |
| 3,205,032 | 9/1965 | Leigh | 312—223 |

WALTER A. SCHEEL, *Primary Examiner.*